United States Patent
Wanner et al.

[11] 3,929,343
[45] Dec. 30, 1975

[54] QUICK-RELEASE TOOL CHUCK

[75] Inventors: Karl Wanner, Echterdingen; Reinhard Hähner, Kemnat; Wolfgang Schmid, Plattenhardt; Gernot Hänsel, Stuttgart-Plieningen; Manfred Bleicher, Leinfelden; Jorg Falchle, Bempflingen, all of Germany

[73] Assignee: Robert Bosch G.m.b.H., Stuttgart, Germany

[22] Filed: Sept. 21, 1973

[21] Appl. No.: 399,723

[30] Foreign Application Priority Data
Oct. 7, 1972 Germany.............................. 2249234

[52] U.S. Cl..................... 279/1 B; 279/62; 279/81; 403/317; 403/349
[51] Int. Cl.² ......................................... B23B 31/04
[58] Field of Search ............... 279/1 B, 1 TS, 81, 62, 279/89, 90, 93; 403/349, 359, 316, 317, 325, 305, 300; 287/DIG. 5

[56] References Cited
UNITED STATES PATENTS
3,685,843 8/1972 Jacyno................................ 279/1 R FOREIGN PATENTS OR APPLICATIONS
233,355 5/1964 Austria.................... 279/62
281,078 12/1927 United Kingdom............... 403/317
574,307 4/1959 Canada.............................. 403/349
362,312 12/1931 United Kingdom................... 279/93
152,019 4/1932 Switzerland......................... 279/103

Primary Examiner—Harrison L. Hinson
Assistant Examiner—Z. R. Bilinsky
Attorney, Agent, or Firm—Michael S. Striker

[57] ABSTRACT

A chuck body has a passage provided with a profiled cross section and with an open end, and a drive shaft has an end portion which is receivable in this passage and is provided with a circumferential recess the inner diameter of which is greater than the smallest diameter of the profiled cross-section. An arresting arrangement is provided, including a ring mounted on the chuck body for turning movement between two end positions, and claw portions movable by the ring into the recess when the ring is in one of its two end positions, so as to arrest the drive shaft against axial movement relative to the chuck body.

9 Claims, 11 Drawing Figures

QUICK-RELEASE TOOL CHUCK

BACKGROUND OF THE INVENTION

The present invention relates generally to tool chucks, and more particularly to quick-release tool chucks.

Quick-release tool-chucks, particularly drill bits, bits in hammer drills and the like, are already known in the art. One prior-art construction utilizes a displaceable element which forces coupling members in form of balls into an annular groove provided in a component which is to be engaged by the chuck, for instance a drill bit. This provides for a connection between chuck and drill bit which prevents relative axial displacement of the tool. In circumferential direction a relative displacement of the tool is prevented by having the passage of the chuck in which a portion of the drill bit is received as well as that portion of the drill bit which is to be lodged in the chuck, be of hexagonal cross-section.

A further prior-art construction of a quick-release tool chuck also uses balls which extend into specific conically formed recesses of the drill bit or the like and which are maintained in this position by a ring which can be turned and forces them into these recesses and which can also be turned so that they can move out of the recesses to disengage the drill bit or other tool from the chuck.

These and other prior-art constructions of the type in question have certain disadvantages. One of these is the fact that only the tool can be exchanged, but not the chuck. In other words, the chuck is only capable of accommodating tools having a particular configuration that is having that part which is to be engaged by the chuck configurated in a particular manner which permits such engagement. The chuck itself, however, cannot be exchanged for a different chuck, for instance if a different tool is to be used which requires the employment of such a different chuck.

A further disadvantage of the prior art is the fact that the connection between chuck and tool is established via the intermediary of the aforementioned balls. Balls, however, provide usually only either line contact or point contact, that is the contact surfaces are very small and high surface pressures develop during the use of the chuck, leading to very rapid wear of the balls. This is particularly true if stresses are transmitted between the tool and the chuck in an abrupt manner. While theoretically it should be possible to reduce the wear by having the balls in complete surface-to-surface contact with the surrounding components which they connect, rather than being only in point or line contact with them, this is a requirement which is so difficult to translate into actual fact (from a technological point of view) that any attempt to do so would lead to economically prohibitive manufacturing expenses.

SUMMARY OF THE INVENTION

Accordingly, it is a general object of the present invention to overcome the disadvantages of the prior art.

More particularly, it is an object of the present invention to provide an improved quick-release tool chuck which avoids the aforementioned disadvantages.

Another object of the invention is to provide such a tool chuck which can readily be exchanged for another, as well as permitting a ready engagement or disengagement of a tool with the chuck.

A further object of the invention is to provide such a tool chuck which permits the engagement of drill bits which are to be rotated, as well as the engagement of drill bits which are to be both rotated and received for axially directed impacts. In the event of the drill bit requiring only rotation, the bit must be precisely retained and guided by the chuck, and in the event that the drill bit is to be both rotated and receive axially directed impacts the transmission of impacting force into the drill bit should be such as to incur the least possible losses of force.

A concomitant object of the invention is to provide a quick-release tool chuck wherein wear and tear of the components involved is maintained at an absolute minimum, and whose manufacturing costs are as low as possible.

In keeping with these objects and with others which will become apparent hereafter, one feature of the invention resides in a quick-release tool chuck, which, briefly stated, comprises a chuck body adapted to engage a tool and having a passage provided with a profiled cross-section and with an open end. A drive shaft has an end portion which is receivable in the passage and is provided adjacent to the profiled end portion with a circumferential recess the inner diameter of which is greater than the smallest diameter of the profiled cross section. Arresting means is provided, including a ring mounted on the chuck body for turning movement between two end positions, and claw portions which are movable by the ring into the recess when the ring is in one of its two end positions, so as to arrest the drive shaft against axial movement relative to the chuck body.

With this construction it is possible, as already indicated above, to utilize claws as coupling elements instead of balls or spherical members as in the prior art. This affords larger force-transmitting surfaces so that the wear on these surfaces is significantly reduced. Since the components involved can be produced as turnings, the manufacturing expenses are relatively low. Because the engagement and disengagement of the arresting means is carried out by turning the aforementioned ring, the axial length of the arrangement can be rather small which is another advantage.

The claws are advantageously so configured that when the ring is in the position in which the arresting means is disengaged, the end portion of the drive shaft can be inserted into the passage of the chuck body, whereas when the ring is in its arresting position, the claws are each located between two circumferentially adjacent inwardly extending portions of the chuck body which is turned inwardly of the passage, whereby the drive shaft is connected with the chuck body against axial movement relative thereto. This means that the coupling elements in form of claws need not be individually fully movable, and can be readily distributed in a relatively large number in circumferential direction of the drive shaft end portion and the passage of the chuck body. This means in turn that a large composite force-transmitting surface area can be obtained, with a corresponding adaption in surface pressure during transmission of force, and a similar reduction in the wear of the components involved.

The chuck body may have conventional tool-engaging jaws so that it can engage conventional tools, for instance, conventional drills bits having a cylindrical shank. It may, however, also be in form of a sleeve into which specially configurated tools can be inserted. It is thus merely necessary, in order to switch over from one type of tool to another, to replace the chuck, that is to use either a chuck having conventional jaws or to use the chuck having the sleeve into which the specially configurated tools can be inserted. The cross-sectional profile of the passage and of the end portion of the drive shaft may be an involute-toothed profile, or it may a splined profile. These profiles can be produces quite readily and provide for large force-transmitting surfaces for transmitting of forces in circumferential direction, and of course large surfaces mean low surface pressure and correspondingly reduced wear. Also, this type of profile provides for an exact engagement and guidance with little radial play between the components, as it is for instance, necessary, when the chuck body is provided with jaws for engagement of conventional cylindrical drill bits. On the other hand, this arrangement permits a relatively loose guidance of drive shaft and chuck body, relative to one another, which is desirable or at least acceptable in the event that the chuck is to be used in applications where the tool is to receive both rotary movement and axial impacts, because under such circumstances a precise guidance is not necessary, whereas the transmission of a maximum of force in axial direction of the tool is most important.

It is advantageous if the ring of the arresting means is surrounded by a sleeve of electrically insulated material, such as polyamide, which is fixedly connected with the ring by shrink-fitting, bonding, frictional engagement or the like, so that such a sleeve can perform the dual function of providing a non-slip surface for engagement by the fingers of the user as well as protecting the user against electrical shock, in the event that any conductive component of the arrangement should unintentionally have become connected to a source of electrical energy, for instance, the source which supplies the drive unit to which the drive shaft is to be connected.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
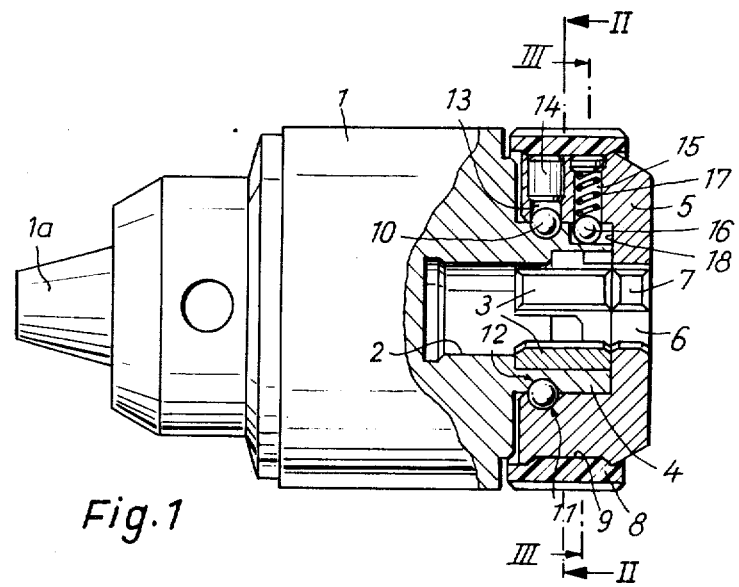
FIG. 1 is a side view, partly in axial section, illustrating a first embodiment of the invention.
Figure 2:
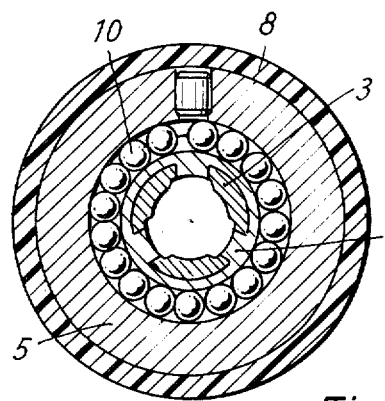
FIG. 2 is a section taken on line II—II of FIG. 1.

Discussing of the drawing firstly the embodiment illustrated in FIGS. 1 – 5, it will be seen that reference numeral 1 identifies a quick-release tool chuck body 1 which is provided with jaws 1a so that it can engage conventional drill bits having a cylindrical shank. At the input side of the chuck body 1, that is the side where the chuck body is to be connected with a non-illustrated drive unit, the chuck body 1 is provided with a blind bore 2 into the inner circumferential surface of which inserts 3 have been mounted so that a portion of the bore or passage 2 is of a profiled cross-section, and more particularly, of a splined cross-section having three teeth which extend inwardly of the bore 2. To permit for an exact guidance of the end portion of the drive shaft 20 (see FIG. 4) which is to be inserted into the bore 2, the latter is ground. Up to approximately half the length of the bore 2, the body 1 is provided with a reduced-diameter annular portion 4 on which there is mounted coaxially with the portion 4, a cup-shaped ring of an arresting means, the ring being identified with reference numeral 5 and being turnable on the portion 4. The ring has an opening 6 the cross-section or profile of which is the same as that defined by the bore 2 and the inserts 3. The profile in the opening 6 results from the provision of claw-shaped portions 7 which extend into the opening 6, as is also evident in FIG. 3.

A sleeve 8 of electrically insulated material, for instance polyamide, surrounds the exterior of the ring 5 in tight engagement therewith, being for instance retained on the ring 5 due to the fact that it is in part received in an outer circumferential groove 9 formed in the outer circumferential surface of the ring 5.

The ring 5 is retained against axial displacement relative to the body 1, due to the provision of a plurality of balls 10, which are each partially received in an inner circumferential groove 11 formed on the inner surface of the ring 5, and an outer circumferential groove 12 formed on the outer surface of the portion 4. The ring 5 is provided with a radial bore 13 which communicates with the groove 11 and through which the balls 10 can be introduced into the radially registering grooves 11 and 12, the bore 13 is subsequently closed by a closure member 14.

A further radial bore 15 in the ring 5 accommodates a ball 16 which is urged in radially inward direction by a spring 17, and which extends into a recess 18 of curvilinear configuration (see FIG. 3) which is formed in the outer circumferential surface of the portion 4. The configuration of the recess 18 is such that the ring 5 can be detained in two circumferentially spaced end positions by means of the ball 16 cooperating with the recess 18.

Figure 3:
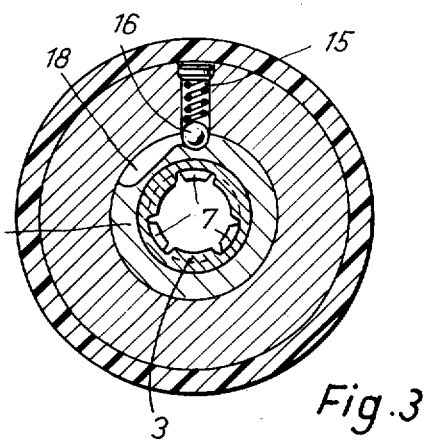
FIG. 3 is a section taken on line III—III of FIG. 1.

FIG. 3 shows the ring 5 in its one end position, in which the claw portions 7 are each located between two circumferentially adjacent ones of the inserts 3, thus locking the shaft 20 in place against axial movement, if the shaft 20 is received in the bore 2.

Figure 4:
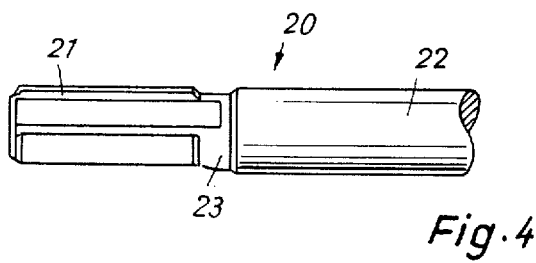
FIG. 4 is a fragmentary side view of a drive shaft for use with the embodiment of FIGS. 1 - 3.

The shaft 20 is shown in more detail in FIG. 4. It may be connected with or may even a part of the non-illustrated drive unit which is to transmit motion to the tool-chuck. The shaft 20 has an end portion provided with circumferentially spaced teeth 21 which are precisely receivable in the bore 2 and the outer diameter of which is ground, as is the bore 2 itself. A cylindrical portion of the shaft 22 is separated from the portion having the teeth 21 by a circumferential recess 23 the inner diameter of which is slightly larger than the root diameter of the teeth 21.

When the end portion of the shaft 20, that is the portion having the teeth 21 is inserted into the bore 2, the claws 7 of the ring 5 extend into the recess 23. To permit such an insertion of the shaft 20 into the bore 2 it is necessary that the ring 5 be first moved to the disengaging position, in which each of the claws or claw portions 7 is located in axial alignment with one of the inserts 3, that is away from the position shown in FIG. 3. When thereafter the end portion of the shaft 20 has been fully inserted into the bore 2, then the ring 5 is moved to the position shown in FIG. 3, in which the claw portions 7 are located not only in the groove 23, but are each located in axial alignment with one of the teeth 21. This prevents axial shifting of the shaft 20 with reference to the chuck body 1, and the mating cross-sectional configuration of the bore 2 with its inserts 3 on the one hand and the teeth 21 of the shaft 20 on the other hand also prevents relative rotation of shaft 20 and chuck body 1.

If the length of the inserts 3 in axial direction of the bore 2 is increased, the surface area via which forces are transmitted in circumferential direction, that is via which torque is transmitted, is similarly increased with a resultant decrease in the surface pressure and the wear which will be experienced. Because the teeth 21 and the cross-section of the bore 2 matingly interengage, as pointed out above, a precise guidance of the tool — as for instance necessary when the non-illustrated drill bit is used for drilling in steel — is assured. Particularly if an involute-tooth profile is employed the components just discussed can be produced very readily. The force-transmitting surfaces which transmit forces in axial rather than in circumferential direction, can also be made rather large on the claws 7 so that here also low wear is obtained with a correspondingly low surface pressure.

Figure 5:
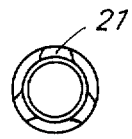
FIG. 5 is an axial end view of FIG. 4, looking towards the right in that Figure.
Figure 6:
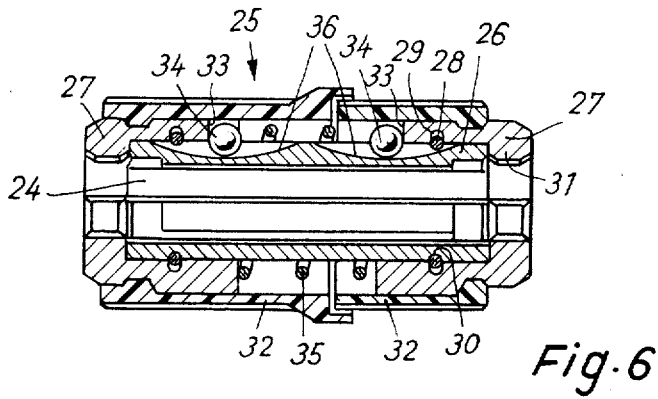
FIG. 6 is an axial section to a further embodiment of the invention.
Figure 7:
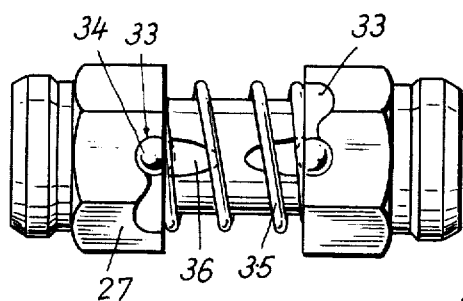
FIG. 7 is a plan view of the embodiment of FIG. 6 with certain portions omitted for the sake of clarity.

The embodiment in FIGS. 6 and 7 illustrates a chuck for use with special tool, for instance special drills which are not only to be rotated but also to receive axially directed impacts. Such drills are for instance used in rock or the like. It is necessary in this embodiment, that the forces generated by the non-illustrated drive unit be transmitted as much as possible to the drill bit itself, so that the force transmission between the drive unit and the drill bit should be as direct as possible in this embodiment. For this reason, there is provided a chuck body 26 having a longitudinally extending open-ended passage 24 the cross-sectional profile of which corresponds to that of the passage 2 in FIGS. 1 - 5. Mounted on the opposite axial ends of the body 26 are respective rings 27 which can be turned relative to the body 26 and which are retained against displacement in axial direction by retaining rings 28 which are each in part located in an inner circumferential groove 29 of the respective ring 27 and in part in an outer circumferential groove 30 of the body 26. Each of the rings 27 is provided with claw portions 31, corresponding to the claw portions 7 of FIGS. 1 - 5. Each of the claw portions 31 extends inwardly of the respective axial end face of the body 26. Sleeves 32 corresponding to the sleeve 8 of FIG. 1 surround the respective rings 27 and are fixedly connected therewith. They facilitate gripping and turning of the rings 27.

The rings 27 are each arrestable in two respective end positions. For this purpose, each of the rings 27 is provided on that axial end facing the other ring with recesses 33 (compare also FIG. 7) into which balls 34 can be snapped by the force of a spring 35 which surrounds the body 26 intermediate the rings 27. The inner diameter of the spring 35 is so selected that the helical spring contacts the balls 34 in that half of the respective ball which is remote from the body 26. The balls 34 are guided in axially extending grooves 36 of the body 26, so that they can move only axially but not circumferentially.

A drive shaft, such as the drive shaft 20 of FIGS. 4 and 5 is inserted into the body 26 through one open end thereof, and is arrested by means of the respective claw portions 31 by turning one of the rings 27, namely the one which is located at that end through which the shaft 20 has been inserted. A drill bit, can now be inserted into the opposite open end of the passage 24, as long as this drill bit has an end portion which is configurated in the same manner as the end portion of the shaft 20, and can be arrested in the same manner as the shaft 20.

In the embodiment of FIGS. 6 and 7, it is important that in axial direction, the claws 31 have a slight amount of play in the respectively associated recess 23 of the shaft 20, to assure that impacts are transmitted from the drive unit directly to the drill bit without leading to excessive wear of the claws 31, as would be the case if no such play were possible.

The inner profile of the passage 24 of body 26 is so configurated that the guidance of the shaft 20 is effected by contact of the radially innermost teeth or projections in the passage 24 with the surface portions intermediate the teeth or projections on the shaft 20, at the root of these latter teeth. The guidance of the chuck 25 need not be as exact as in FIGS. 1 - 5, because in the embodiment of FIGS. 5 and 6, the major importance is placed upon the transmission of impacts from the drive unit to the drill bit, and not so much upon the transmission of rotary motion. In any case, a very exact guidance analogous to that of FIGS. 1 - 5 would lead to premature wear, due to the substantial amounts of stone chips and stone powder which can enter into the chuck when the latter is used with the special drill bits mentioned above, which are predominantly employed for drilling in rock and the like. In the embodiment of FIGS. 6 and 7, this is of little consequence, due to the particular construction which has been chosen.

Figure 8A:
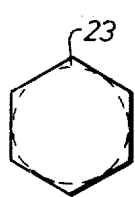
FIGS. 8a – 8d are respective end views, illustrating further cross-sectional configurations that can be chosen for the end portion of the drive shaft which is to be engaged with the chuck body.
Figure 8B:
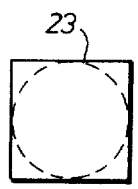
Figure 8C:
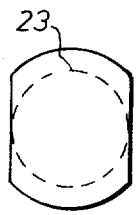
Figure 8D:
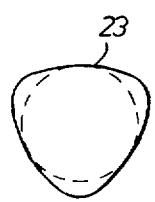

It will be appreciated that the cross-sectional profile of the passage 24 or the bore 2, as well as the cross-sectional profile of the end portion of the shaft 20 which is to be inserted into the passage or bore, can be different from what has been thus far described, and illustrated. For instance, FIG. 8 shows that this cross-sectional configuration could be hexagonal, FIG. 8b shows that it could be quadratic, FIG. 8c shows that it could be flat having two opposite facets, and FIG. 8d shows that it could be polygonal. Evidently, the claws or claw portions would then be configurated in a different manner from what has been illustrated, namely in such a manner that the associated ring 5 or 27 is in the disengaging position, the claws permit the insertion of the end portion of the shaft 20 into the bore 2 or the passage 24. However, in the case of the embodiment of FIG. 8a, the surface area available for transmitting impacts in axial direction is lesser than in the case of the aforementioned evolvent or spline-shaped profile. In the case of FIG. 8b, the dimension of the chuck in radial direction will have to be greater than in the aforementioned evolvent or spline-shaped profile, and proper axial guidance cannot be readily obtained. In the case of FIGS. 8c and 8d, the manufacture of the respective cross-sectional profile is more difficult than in the other embodiments, and therefore, more expensive. However, these considerations aside, it will be appreciated that profiles such as are shown in FIGS. 8a – 8d can be used if it should be desired to do so.

It will be understood that each of the elements described above, or two or more together, may also find a useful application in other types of constructions differing from the types described above.

While the invention has been illustrated and described as embodied in a quick-release tool chuck, it is not intended to be limited to the details shown, since various modifications and structural changes may be made without departing in any way from the spirit of the present invention.

Without further analysis, the foregoing will so fully reveal the gist of the present invention that others can, by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

1. A quick-release tool chuck, comprising a chuck body including jaw means for engaging a tool and having a passage provided with a profiled cross-section having circumferentially spaced profiled portions extending inwardly of said passage, and with an open end; a drive shaft having an end portion which is receivable in said passage and provided adjacent to the profiled end portion with a circumferential recess the inner diameter of which is greater than the smallest diameter of said profiled cross-section; and arresting means, including a ring mounted on said chuck body for turning movement between two end positions, retaining means for retaining said ring in said respective end positions thereof, the claw portions displaceable circumferentially of said passage between a release position in which they are each located in axial alignment with one of said profiled portions, and an arresting position in which they are each located between two circumferentially adjacent ones of said profiled portions, so as to arrest said drive shaft against axial movement relative to said chuck body; and detent means for detaining said ring against movement relative to said body in axial direction of said passage, said detent means having an outer circumferential groove provided in a surface of said body which is surrounded by said ring, an inner circumferential groove provided in an inner surface of said ring and registering with said outer groove, and a plurality of ball members each received partly in said inner groove and partly in said outer groove.

2. A chuck as defined in claim 1, wherein said claw portions are part of said ring and turnable with the same.

3. A chuck as defined in claim 1, wherein said retaining means includes a substantially radial bore provided in said ring, recesses provided in a surface of said body which is surrounded by said ring, a ball in said bore, and a spring urging said ball into contact with said surface so that the ball snaps into a respective recess when the same is in radial registry with said bore.

4. A chuck as defined in claim 1, wherein said profiled cross-section and the cross-section of said end portion are involute-tooth profiles.

5. A chuck as defined in claim 1, wherein said profiled cross-section and the cross-section of said end portion are splined profiles.

6. A chuck as defined in claim 1, wherein said profiled cross-section and the cross-section of said end portion are polygonal.

7. A chuck as defined in claim 1; and further comprising a sleeve of electrically insulating material surrounding and fixedly connected with said ring.

8. A chuck as defined in claim 7, wherein said insulating material is polyamide.

9. A chuck as defined in claim 1, wherein said profiled cross-section and the cross-section of said end portion are polyhedral.

* * * * *